INVENTORS
TUBAL CLAUDE RYAN
PETER F. GIRARD
BY Knox & Knox

INVENTORS
TUBAL CLAUDE RYAN
PETER F. GIRARD
BY
Knox & Knox

United States Patent Office 3,159,360
Patented Dec. 1, 1964

3,159,360
JET POWERED VTOL AIRCRAFT
Tubal Claude Ryan, San Diego, and Peter F. Girard, La Mesa, Calif., assignors to The Ryan Aeronautical Co., San Diego, Calif.
Filed Jan. 20, 1964, Ser. No. 338,947
7 Claims. (Cl. 244—7)

The present invention relates to aircraft and more particularly to a jet powered VTOL aircraft.

Aircraft having vertical take-off and landing capability are powered in various ways, such as by separate engines for lift and propulsion, the lift engines being inoperable in high speed flight. Other types use deflected thrust from primary propulsion jet engines, involving deflectors or large movable nozzles which are subjected to high temperature gas flow. Helicopters have great maneuverability in hovering and low speed flight, but are limited in forward speed unless the rotor is made retractable by some complex means, and fixed wings used for lift.

The primary object of this invention is to provide an aircraft which can take off and land vertically, or with a very short run, hover, move in any direction at low speed, yet is capable of supersonic flight, with smooth and fully controlled transition between vertical and horizontal flight.

Another object of this invention is to provide an aircraft having a wing which is fixed for high speed flight, but is rotated by the primary propulsion jet engine during low speed flight and transition and has movable tip portions which act as lifting rotor elements when the wing is rotating.

Another object of this invention is to provide an aircraft wherein the wing propulsion means is not subjected to the high temperature of jet engine exhaust gases, so simplifying construction.

Another object of this invention is to provide an aircraft which is very stable in all phases of flight and has a wide range of center of gravity location under all flight conditions.

Still another object of this invention is to provide an aircraft wherein the wing can auto-rotate to provide added lift for a safe landing in the event of engine failure.

A further object of this invention is to provide an aircraft wherein the control systems for vertical and horizontal flight are interconnected, the same pilot operated controls being used, without change over, through all phases of flight and being the standard and instinctive controls of more conventional aircraft.

In the drawings.

Similar characters of reference indicate similar or identical elements and portions throughout the specification and throughout the views of the drawings.

Basic Aircraft

The aircraft has a fuselage 20, designed to suit the particular purpose of the aircraft, with a large upright pylon 22 substantially at the center of gravity position. Mounted on top of the pylon 22 is a wing 24 of modified delta form, having a center section 26 with three symmetrical radially extending arms 28 of low aspect ratio, said arms carrying similar tip portions 30, 32 and 34. The center section 26 comprises a considerable portion of the total wing area, the radial cross section of the wing at any position being a substantially lenticular airfoil. The precise aerodynamic contours of the wing will depend on the intended range of performance.

Figures 3, 4:
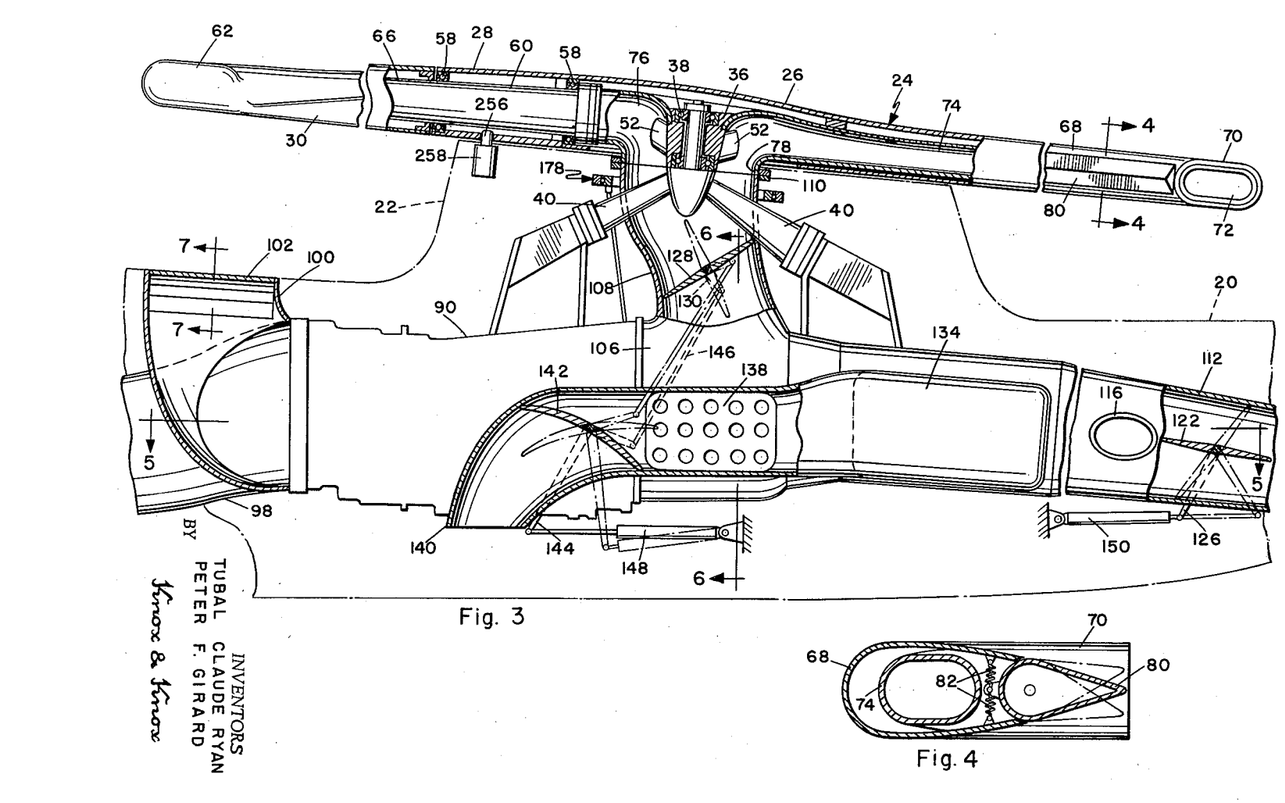
FIGURE 3 is an enlarged side elevation view of the propulsion system, with portions cut away.
FIGURE 4 is an enlarged sectional view taken on line 4—4 of FIGURE 3.

At the center of the wing 24 is a hub 36 freely rotatably mounted on a bearing 38 which is carried by support frames 40, as in FIGURE 3, the frames being secured in a suitable manner to the main fuselage structure, not shown. The axis of bearing 38 is generally perpendicular to the longitudinal axis of the aircraft and slightly aft of the normal center of gravity position for stability reasons, although a slight inclination of the axis is indicated to give the wing a positive angle of incidence in fixed position.

At the rear of fuselage 20 is a tail assembly comprising a vertical fixed fin 42 having a movable rudder 44, and a horizontal stabilizer or tailplane 46 fixed to the top of said fin. The tailplane 46 is fitted with movable elevons 48 which serve as elevators and ailerons for pitch and roll control, as hereinafter described. Other tail arrangements may be used, but it is desirable to keep the tailplane high and clear of the downwash from the wing.

Figures 1, 2:
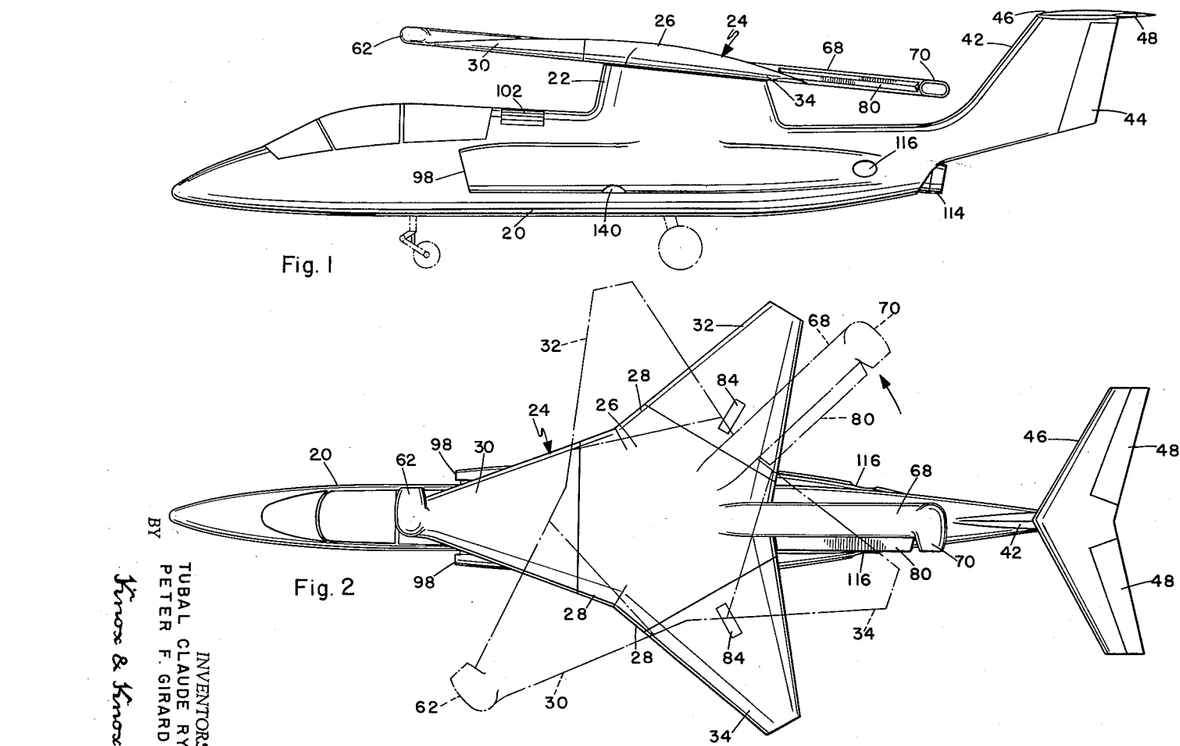
FIGURE 1 is a side elevation view of the aircraft.
FIGURE 2 is a top plan view thereof.

Landing gear, indicated in broken line in FIGURE 1, may be arranged to suit the particular aircraft.

Wing Assembly

Figures 8, 9:
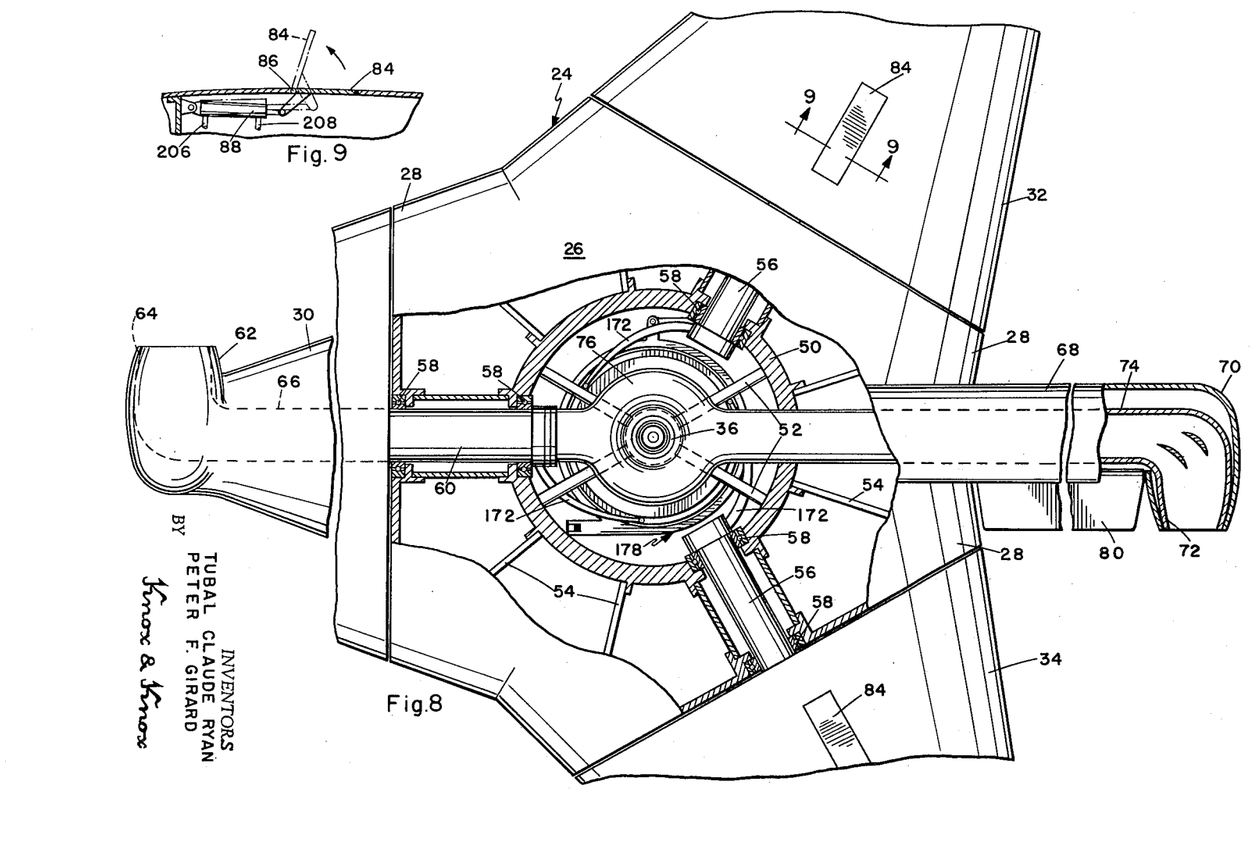
FIGURE 8 is an enlarged top plan view of the wing, with portions cut away.
FIGURE 9 is an enlarged fragmentary sectional view taken on line 9—9 of FIGURE 8.

The specific structure of the wing may vary, a typical arrangement being illustrated in FIGURE 8. The center section 26 contains a ring member 50, from which hub 36 is coaxially supported by arms 52, said ring member being connected to the center section structure through ribs 54 which form the airfoil shape. The tip portions 32 and 34 are carried by radially extending hinge shafts 56 journalled in bearings 58 in the ring member 50 and the outer ends of center section 26. Tip portion 30 is carried by a hollow hinge shaft 60 similarly supported in bearings 58. At the outer end of tip portion 30 is a tip jet unit 62 having a nozzle 64 exhausting in the plane of the wing and generally perpendicular to the axis of said tip portion. Tip jet unit 62 is coupled to the hollow hinge shaft 60 by a duct 66 extending axially through the tip portion.

Diametrically opposite tip portion 30 is a boom 68 extending radially from center section 26, symmetrically between tip portions 32 and 34. At the outer end of boom 68 is a tip jet unit 70 having a nozzle 72 exhausting in the plane of the wing and perpendicular to the boom. Both tip jet units are at the same distance from the axis of rotation of the wing and thrust in opposite directions to apply rotation to the wing. By using tip jet propulsion, the need for anti-torque means is eliminated. A duct 74 extends from tip jet unit 70 to a plenum chamber 76 surrounding hub 36, said plenum chamber also being connected to hollow hinge shaft 60. The plenum chamber 76 has a downwardly projecting cylindrical throat 78 coaxial with hub 36.

The diametrically opposed arrangement of the tip jet units minimizes frontal area and drag when the wing is in fixed position in forward flight. Each tip portion could be fitted with a tip jet unit, but those on the laterally disposed tips of the stationary wing would cause excessive drag and be aerodynamically undesirable in high speed flight. The boom 68 is streamlined in cross section in the direction of rotation and is designed so that the drag of the boom is equal to the drag of the thickened parts of tip portion 30 and the associated arm 28 to accommodate duct 66. Aerodynamic balance of the wing is further assisted by a floating flap 80 pivotally attached to the trailing edge of boom 68 to adjust itself to the direction of airflow over the boom and nullify lift effect of the boom during wing rotation. Flap 80 may be centered by light springs 82, as in FIGURE 4, to prevent drooping in forward flight. The entire wing is, of course, balanced for smooth rotation. In the upper surface of each tip portion 32 and 34 is a drag brake 84 extending radially on the tip portion and comprising a small panel mounted on a hinge 86 to swing upwardly and forwardly, relative to the fixed position of the wing, as in FIGURE 9. Each drag brake 84 is operated by a suitable actuator 88 controlled by a valve 89 which is connected to pressure lines 206 and 208, the purpose being described hereinafter in the operation of the aircraft.

*Propulsion System*

Figure 5:
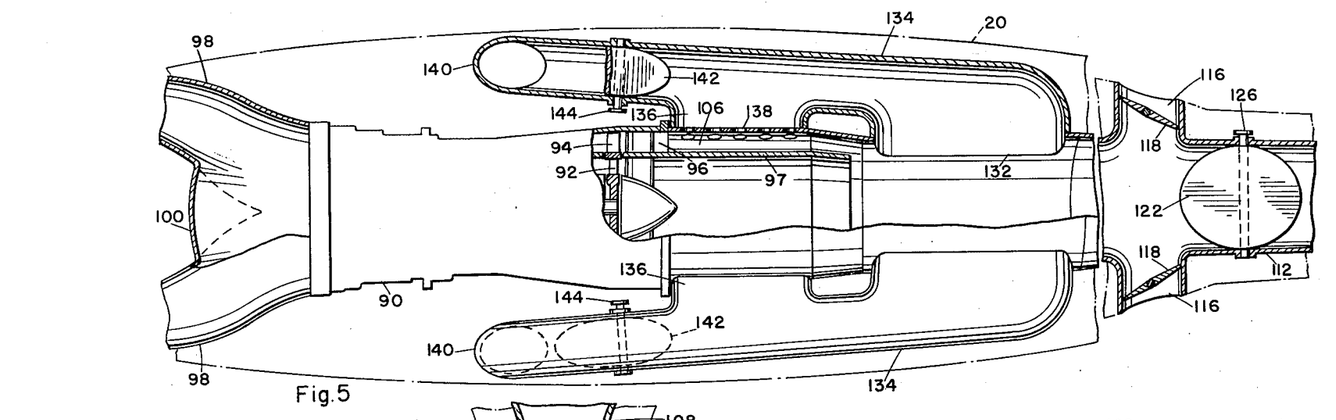
FIGURE 5 is a sectional view taken on line 5—5 of FIGURE 3.
Figure 6:
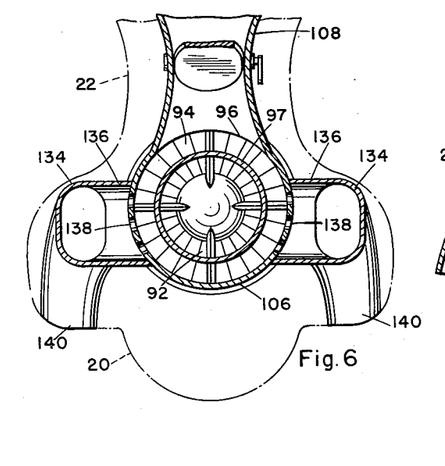
FIGURE 6 is a sectional view taken on line 6—6 of FIGURE 3.

The sole source of propulsion for the aircraft is a high ratio bypass turbojet engine 90, also known as a turbofan engine and being in common use in aircraft. In this type of engine a portion of the incoming air is bypassed around the turbojet itself and is propelled by a fan driven by the turbojet. As shown somewhat diagrammatically in FIGURES 5 and 6, the turbine 92 is coupled to a fan 94 which runs in a bypass air duct annulus 96 surrounding and concentric with the turbine and extended axially by a cylindrical shroud 97. The usual high velocity, high temperature column of hot gases exhausts from the turbine 92, while the fan provides an annulus of relatively cool air which greatly adds to the total mass flow of the exhaust.

Figure 7:
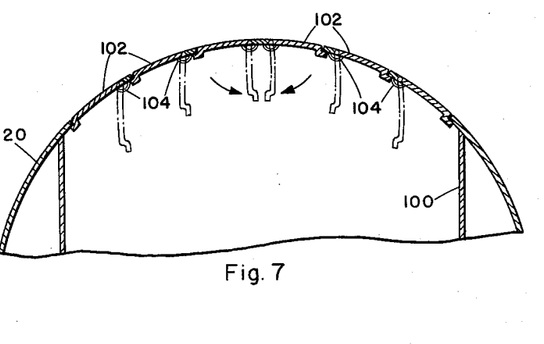
FIGURE 7 is an enlarged fragmentary sectional view taken on line 7—7 of FIGURE 3.

The engine 90 is provided with air intakes 98 from the sides of the fuselage 20 and a secondary intake duct 100 from the top of the fuselage forward of pylon 22. The secondary intake opening is fitted with a plurality of doors 102 conforming to the fuselage contours when closed and being hinged to swing downwardly into the duct 100, as indicated in FIGURE 7. Doors 102 are biased to the closed position by spring elements 104 of any suitable type and will be held closed by pressure in duct 100 in excess of the external pressure over the doors. However, if the engine becomes starved of air, as in low speed flight when the ram effect in the intakes 98 is low, the interior reduction in pressure will cause the doors to open and admit additional air. The doors will also be opened by the downwash from wing 24, which will normally be rotating at the low speeds where the flow through intakes 98 may be inadequate. Secondary air flow control is thus automatic and need not concern the pilot.

The engine 90 exhausts into a distributor chamber 106, from which a rotor duct 108 extends upwardly, and is coupled to plenum chamber throat 78 by a rotary seal 110 of suitable type. Extending from the rear of distributor chamber 106 is a tailpipe 112, ending in a propulsion nozzle 114 below the fin 42. Tailpipe 112 has a pair of opposed lateral outlets 116 in which are pivotally mounted a pair of yaw control valves 118 having actuating arms 120, said valves being aerodynamically balanced so that pressure in the tailpipe holds the valves closed. In the tailpipe 112 aft of lateral outlets 116 is a thrust control valve 122 pivotally mounted to swing between a closed position blocking the tailpipe and an open position in which the valve is streamlined to the exhaust gas flow, said valve having an actuating arm 126.

A rotor control valve 128 is similarly mounted in rotor duct 108 to swing between a position completely blocking the duct and a position streamlined to the flow through the duct, and has an actuating arm 130.

Aft of the rotor duct 108, the distributor chamber has opposed lateral openings 132 leading to return duct 134 which extend forwardly along the sides of the chamber. opposed lateral openings 132 leading to return ducts 134 are again connected to the distributor chamber 106 by stub ducts 136, at the inner ends of which are perforated mixing baffles 138, comprising portions of the walls of the chamber. Forward of the stub ducts 136 the return ducts are turned downwardly and end in lift nozzles 140, which are positioned substantially at the longitudinal C.G. position of the aircraft to avoid a pitching action.

In the return ducts 134 forward of stub ducts 136 are outlet valves 142 hinged to swing between positions blocking the return duct and positions streamlined to the flow therein. The outlet valves 142 have actuating arms 144 and are coupled in any suitable manner to operate simultaneously, said valves also being connected to rotor valve 128 by a link 146 to open and close in unison therewith.

Figure 11:
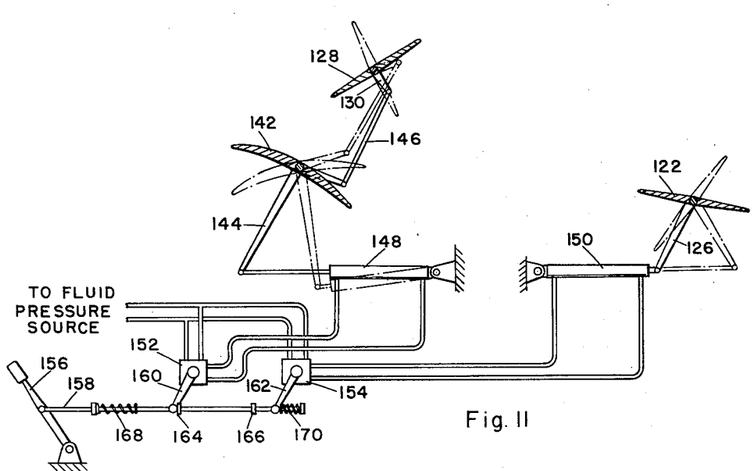
FIGURE 11 is a diagrammatic view of the thrust control valve system.

The outlet valves 142 are operated by an actuator 148 and thrust control valve 122 is operated by an actuator 150, the actuators being indicated as fluid jacks for simplicity. To ensure proper control of the engine exhaust gases during transition operations and control changes, the thrust control valve 122 must open before the rotor valve 128 and outlet valves 142 close, a lead of about 30 degrees being desirable. Similarly, valve 122 must close after valves 128 and 142 open, with a lag of about 30 degrees. This can be accomplished in various ways by timing the actuators 148 and 150. A typical arrangement is illustrated in FIGURE 11, in which actuator 148 is controlled by a valve 152 and actuator 150 is controlled by a valve 154. A pilot operated thrust control handle 156 is coupled by a rod 158 to both valves, the rod being slidable through the ends of the valve control arms 160 and 162. Rod 158 has fixed stops 164 and 166 which engage arms 160 and 162 at different times as the rod is moved, and springs 168 and 170 are fitted on the rod to engage the arms in opposite directions, so allowing over travel of the rod in a particular direction relative to each valve. This lost motion type of linkage for timed control action of valves is well known in various forms.

*Flight Control System*

Figure 10:
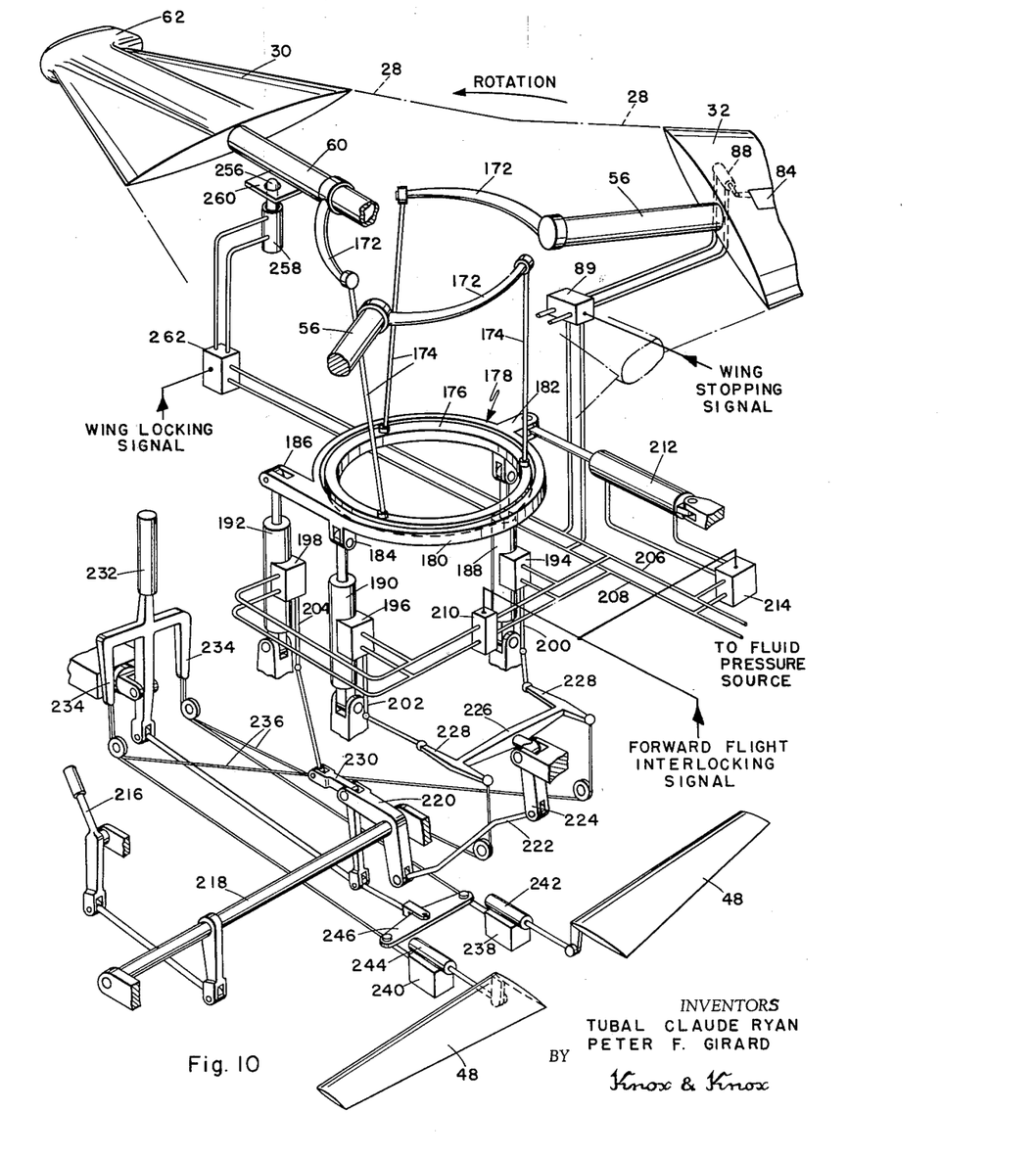
FIGURE 10 is a diagrammatic perspective view of the basic control system.
Figure 12:
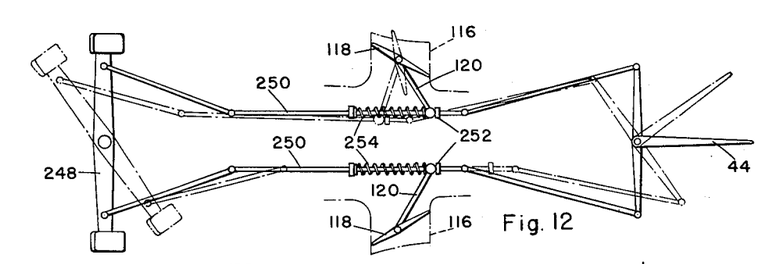
FIGURE 12 is a diagrammatic view of the yaw control system.
Figure 13:
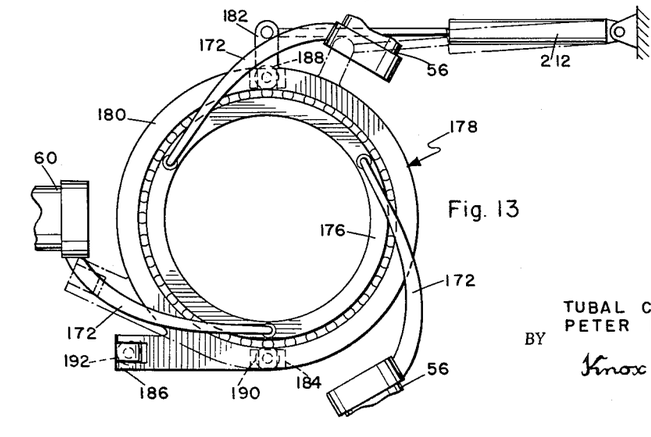
FIGURE 13 is a top plan view of the pitch control means for the wing rotor portions.

The complete flight control system is illustrated in FIGURES 10, 12 and 13. The wing tip portions 30, 32 and 34 are pivotal on their respective hinge shafts and are thus variable in pitch relative to the center section 26. Pitch control arms 172 extend from hinge shafts 56 and 60 and are pivotally connected by tie rods 174 to the rotating ring 176 of a swash plate 178, which can be inclined in any direction. This arrangement is basically that of conventional helicopter rotor and is well known in structure and operation. The non-rotating control ring 180 of swash plate 178 has a roll control arm 182 extending laterally from one side thereof, and a hinge fitting 184 below the ring diametrically opposite said arm, while projecting forwardly from the control ring is a pitch control arm 186. A jack 188 is connected to roll control arm 182 to provide up and down motion, a jack 190 being similarly connected to hinge fitting 184 and a further jack 192 to pitch control arm 186. Jacks 188, 190 and 192 are provided respectively with proportional control valves 194, 196 and 198, which have control rods 200, 202 and 204. All of the jacks are coupled to pressure lines 206 and 208 from a fluid pressure source, not shown, with a cut-off valve 210 installed between the pressure source and jacks 190 and 192. Thus these latter two jacks can be shut off, leaving jack 188 still operative. A phase control jack 212 is attached to the outer end of roll control arm 182 to rotate the control ring 180 through a predetermined angle about the axis of rotation of ring 176. Jack 212 is coupled to the pressure lines 206 and 208 through a reversible control valve 214.

A pilot operated collective pitch control 216 is coupled to a rocker shaft 218 on which is a bell crank 220, one arm of the bell crank being connected by a link 222 to a pivoted arm 224. At the pivot of arm 224 is a generally H-shaped spider member 226 pivotal at its center on an axis perpendicular to the pivotal axis of said arm, said spider member having arms 228 at opposite ends thereof, which are connected to valve control rods 200 and 202. The other arm of bell crank 220 carries a secondary bell crank 230, one arm of which is coupled to valve control rod 204, the other arm of bell crank 230 being linked to the lower end of a universally mounted control stick 232 which operates in the manner of a conventional aircraft control stick. When collective pitch control 216 is moved, bell crank 220 causes arm 224 to swing together with spider member 226, so moving both valve control rods 200 and 202. At the same time, secondary bell crank 230 is carried by the bell crank 220 and moves control rod 204. Thus all three jacks 188, 190 and 192 are operated simultaneously to raise or lower swash plate 178 and apply a collective pitch change to all three tip portions 30, 32 and 34.

Control stick 232 has lateral arms 234 which are coupled by cables 236 to spider arms 228, so that side-to-side rocking motion of the control stick causes corresponding rocking of spider member 226. This moves control rods 200 and 202 in opposite directions, causing jacks 188 and 190 to incline swash plate 178 laterally and apply a rolling action to the cyclic pitch motion. Fore and aft motion of control stick 232 swings secondary bell crank 230, operating jack 192 and applying a pitch control action to the cyclic pitch motion. The cyclic pitch action of a rotor is well known and need not be described in detail.

The lateral arms 234 of control stick 232 are connected to control valves 238 and 240 of jacks 242 and 244, which actuate the elevons 48. Through secondary bell crank 230 the control stick is also coupled to a connecting bar 246 between the control valves 238 and 240. It will be evident that fore and aft motion of the control stick will provide collective up and down motion of elevons 48 in the manner of elevators, while lateral motion of the stick will provide differential action in the manner of ailerons. Thus the vertical and horizontal flight controls are interconnected and operated by common control means.

Yaw control is provided by a conventional rudder bar 248, is in FIGURE 12, or by a pair of pedals, the rudder bar being connected by rods 250 to the actuating arms 120 of yaw control valves 118. Rods 250 are slidable through arms 120 and each have a stop 252 on one side of the arm with a spring 254 on the other side, allowing each valve to operate independently with one opening while the other remains closed. Rods 250 extend to the rudder 44 which is operated in conjunction with the yaw control valves 118 to avoid separate controls. The neutral position of the mechanism is indicated in full line in FIGURE 12, with an offset position for a turn to the right indicated in broken line.

The control system as illustrated is merely a simplified example of a working system and is in no way limited to the specific mechanisms or actuators shown.

Wing 24 is held in the fixed position by a latch 256 operated by an actuator 258 in the pylon 22, said latch engaging in a socket member 260 in the arm 28 carrying tip portion 30, as in FIGURE 10. Actuator 258 is connected through a latching valve 262 to the pressure supply lines 206 and 208, the valve being controlled by a suitable signal, either initiated by the pilot or by automatic means when the wing stops rotating.

*Operation*

For vertical take-off control handle 156 is set to open rotor control valve 128 and outlet valves 142, with thrust control valve 122 closed, as indicated in broken line positions in FIGURES 3 and 11. The exhaust gases from engine 90 are then diverted into the rotor duct 108 and return ducts 134. Within the distributor chamber 106 the hot engine exhaust gases and cool bypass air mix to some extent, so that the resultant exhaust is cooled before reaching the wing plenum chamber 76. The hot exhaust gases are carried beyond rotor duct 108 by the shroud 97 and flow back through return ducts 134, mixed together with cool bypass air, to mix further through baffles 138 with the bypass air flowing to the rotor duct. The degree of mixing can be controlled by the particular design of the distributor chamber 106, the mixing baffles 138, and other factors. If necessary, vanes or other devices can be used to increase mixing. In any event, the gases directed to the wing are considerably cooler than the direct turbine efflux and the materials used in the wing ducts and tip jets need not have the high heat resistance of the tailpipe and engine portions. The gases are fed from plenum chamber 76 through ducts 66 and 74 to the tip jet units 62 and 70, the resultant thrust causing the wing 24 to rotate, as indicated in the broken line position in FIGURE 2. Latch 256 is, of course, released at this stage.

With the wing rotating the collective pitch control 216 is used to increase pitch on the wing tip portions, now acting as rotor elements, causing the aircraft to lift. The phase control jack 212 is actuated to rotate the control ring 180 against the direction of wing rotation, to the position indicated in broken line in FIGURE 13. In this position the motions of the swash plate 178 are applied to the arms 172 to control the tip portions at the proper time during rotation, as in conventional helicopter practice. Control stick 232 is used to control the aircraft by cyclic pitch changes in the manner of a helicopter, yaw or directional control being obtained by the selective opening of valves 118 through rudder bar 248 to provide lateral thrust. A portion of the exhaust gases flowing back through return ducts 134 is exhausted downwardly from lift nozzles 140, so adding to the overall lift of the aircraft. If the engine does not receive sufficient air through intakes 98, the doors 102 will open automatically and admit additional air from the downwash of the wing.

For transition to forward flight, control handle 156 is moved to begin opening thrust control valve 122, so that exhaust gases are expelled from propulsion nozzle 114 and the aircraft begins to move forward. At the same time the gas flow to the tip jets 62 and 70 is reduced and wing rotation begins to slow down. As forward speed increases the aerodynamic lift of the wing compensates for the reduction in rotor lift, control being maintained constantly through cyclic and collective pitch control until the aerodynamic surfaces become effective. The elevons 48 and rudder 44 are operable at all times with the wing and lateral thrust control means, transition being smooth and positive.

Valves 128 and 142 are now closed, with thrust control valve 122 fully open to apply all engine thrust to forward propulsion, as indicated in the full line positions in FIGURES 3 and 11. With forward speed still increasing, collective pitch is reduced until the wing tip portions are at zero pitch. All lift is now obtained from the aerodynamic lift of the wing, which is still freely rotating. To stop wing rotation the drag brakes 84 are extended and, with no power and the added drag, the wing is rapidly stopped. Since the drag brakes 84 are radially mounted on tip portions 32 and 34, the airflow over the wing will tend to streamline the drag brakes to the flow with a balancing action. This balanced drag automatically aligns the tip portion 30 forwardly over the pylon 22, so that latch 256 can be engaged to lock the wing in place, after which drag brakes 84 are retracted.

Phase control jack 212 is then operated to return the control ring 180 to the forward flight position indicated in full line in FIGURE 13 and as shown in FIGURE 10, at the same time closing cut-off valve 210 and disabling jacks 190 and 192. It will be evident that in this position, the arms 172 from laterally disposed tip portions 32 and 34 are both connected to swash plate 178 on the same side of the longitudinal axis of the aircraft, adjacent roll control arm 182. Since jack 188 alone is now operable, lateral motion of control stick 232 will actuate this single jack and raise and lower one side of swash plate 178, pivoting about hinge fitting 184. The end connections of all jacks will be pivotally capable of handling all the necessary motions, suitable fittings being readily available. This particular swash plate motion will cause the tip portions 32 and 34 to move in opposite directions in the manner of ailerons and in conjunction with elevons 48.

Rudder 44 and valves 118 operate in unison at all times, thus the entire control system is continuously operable by the same pilot's controls and by the same actions through all phases of flight, making the aircraft simple to fly.

Landing is accomplished by reversing the take-off transition process. The wing is unlatched, then control handle 156 is moved to direct the engine exhaust gases to the tip jet 62 and 70, while blocking off propulsion nozzle 114, so that forward speed is reduced. Control ring 180 is moved to the vertical flight position by phase control jack 212 and the aircraft is flown in the manner of a helicopter to the required landing area.

The combined wing and rotor is very efficient over an extremely wide speed range. The wing can be of small area compared to those of conventional aircraft, since the wing is used in fixed position only in high speed flight when a high wing loading is normal in jet aircraft. In rotating operation the large effective disc area has a low disc loading for vertical take-off and landing, the large tip portions providing a considerable rotor area. The opposed arrangement of the tip jets greatly reduces drag at high speed. The wing is used in its entirety in both vertical and horizontal flight and at all speeds, without the need for retractable structures or changes in configuration, and the structure is adaptable to aircraft of various performance characteristics.

It is understood that minor variation from the form of the invention disclosed herein may be made without departure from the spirit and scope of the invention, and that the specification and drawings are to be considered as merely illustrative rather than limiting.

We claim:

1. An aircraft comprising:
   an airframe;
   a wing having a center section and three radially extending arms;
   said wing being mounted on said airframe for rotation about an axis perpendicular to the plane of the wing at the center of symmetry thereof;
   said arms having tip portions comprising rotor elements pivotally mounted on substantially radial axes for inclination relative to the chord plane of the wing;
   control means operatively connected to said tip portions to vary the inclination thereof cyclically and collectively as the wing rotates;
   a wing rotating tip jet unit mounted on one of said tip portions;
   a further wing rotating jet unit mounted on said wing in diametrical opposition to said first jet unit;
   a source of compressed gases coupled to said jet units;
   and locking means to hold said wing in a fixed position with said jet units disposed along the longitudinal axis of the aircraft.

2. An aircraft comprising:
   an airframe;
   a wing having a center section and three radially extending arms;
   said wing being mounted on said airframe for rotation about an axis perpendicular to the plane of the wing at the center of symmetry thereof;
   said arms having tip portions comprising rotor elements pivotally mounted on substantially radial axes for inclination relative to the chord plane of the wing;
   control means operatively connected to said tip portions to vary the inclination thereof cyclically and collectively as the wing rotates;
   a wing rotating tip jet unit mounted on one of said tip portions;
   a boom extending from said center section in diametrical opposition to said one tip portion;
   a further wing rotating jet unit mounted on said boom;
   a source of compressed gases coupled to said jet units;
   and locking means to hold said wing in a fixed position with said jet units disposed along the longitudinal axis of the aircraft.

3. An aircraft according to claim 2 wherein said boom is streamlined in cross section in the direction of wing rotation;
   said boom having a flap longitudinally coextensive with the trailing edge thereof;
   said flap being substantially freely pivotal to vary the effective cross section of the boom in accordance with surrounding airflow and minimize aerodynamic lift of the boom.

4. An aircraft according to claim 2, wherein said source of gases comprises:
   a turbojet engine mounted in said airframe, said engine having an integral fan portion providing an annulus of cool air surrounding the primary exhaust gas flow;
   a distributor chamber connected to the exhaust end of said engine;
   a tailpipe extending rearwardly from said distributor chamber;
   a rotor duct communicating from said distributor chamber to said jet units;
   valve means to direct the engine exhaust flow selectively to said tailpipe and said rotor duct;
   and mixing inducing means in said distributor chamber to cause mixing of the combustion gases and cool air from said engine before entry into said rotor duct.

5. An aircraft according to claim 2, wherein said source of gases comprises:
   a turbojet engine mounted in said airframe, said engine having an integral fan portion providing an annulus of cool air surrounding the primary exhaust gas flow;
   a distributor chamber connected to the exhaust end of said engine;
   a tailpipe extending rearwardly from said distributor chamber;
   a rotor duct communicating from said distributor chamber to said jet units;
   valve means to direct the engine exhaust flow selectively to said tailpipe and said rotor duct;
   return ducts extending laterally and forwardly from said distributor chamber and having downwardly directed nozzles;
   perforated mixing baffles in said distributor chamber to cause mixing of the combustion gases and cool air from said engine before entry into said rotor duct; and
   said mixing baffles communicating between said distributing chamber and said return ducts.

6. An aircraft according to claim 2, wherein said source of gases comprises:
   a turbojet engine mounted in said airframe, said engine having an integral fan portion providing an annulus of cool air surrounding the primary exhaust gas flow;
   a distributor chamber connected to the exhaust end of said engine;

a tailpipe extending rearwardly from said distributor chamber;
a rotor duct communicating from said distributor chamber to said jet units;
return ducts extending laterally and forwardly from said distributor chamber and having downwardly directed nozzles;
perforated mixing baffles in said distributor chamber to cause mixing of the combustion gases and cool air from said engine before entry into said rotor duct;
said mixing baffles communicating between said distributing chamber and said return ducts;
a rotor control valve mounted in said rotor duct;
outlet valves mounted in said return ducts;
said rotor control valve and said outlet valves being interconnected to move in unison between closed positions closing the respective ducts and open positions in the ducts;
and a thrust control valve mounted in said tailpipe and being coupled to said rotor control and outlet valves to move in opposition thereto between open and closed positions.

7. An aircraft comprising:
an airframe;
a wing having a center section and three radially extending arms;
said wing being mounted on said airframe for rotation about an axis perpendicular to the plane of the wing at the center of symmetry thereof;
said arms having tip portions comprising rotor elements pivotally mounted on substantially radial axes for inclination relative to the chord plane of the wing;
control means operatively connected to said tip portions to vary the inclination thereof cyclically and collectively as the wing rotates;
a wing rotating tip jet unit mounted on the tip portion of one of said arms;
a further wing rotating jet unit mounted on said wing in diametrical opposition to said first jet unit;
a source of compressed gases coupled to said jet units;
drag brake elements mounted in the other two of said arms symmetrically relative to the axis through said jet units and being extensible into the surrounding airflow, whereby the resultant drag will stop rotation of the wing with said jet units disposed longitudinally to the direction of motion of the aircraft;
and locking means to secure said wing in fixed position with said jet units along the longitudinal axis of the aircraft.

References Cited by the Examiner
UNITED STATES PATENTS 2,674,421 4/54 De Cenzo ______________ 244—7.1
3,025,022 3/62 Girard ________________ 244—7.1

FOREIGN PATENTS 827,852 2/60 Great Britain.

FERGUS S. MIDDLETON, *Primary Examiner.*